United States Patent [19]
Croslin

[11] Patent Number: 5,881,048
[45] Date of Patent: Mar. 9, 1999

[54] METHOD AND APPARATUS FOR DETERMINING MAXIMUM NETWORK FAILURE SPANS FOR RESTORATION

[75] Inventor: William D. Croslin, Colorado Springs, Colo.

[73] Assignee: MCI Communication Corporation, Del.

[21] Appl. No.: 758,111

[22] Filed: Nov. 25, 1996

[51] Int. Cl.$^6$ ............................... H04J 3/14; G06F 11/00
[52] U.S. Cl. .......................... 370/228; 370/258; 379/221; 395/182.02
[58] Field of Search ...................... 370/217, 218, 370/225, 228, 254, 258; 340/825.01, 825.03, 826, 827; 379/220, 221, 271, 272, 273; 395/181, 182.01, 182.02, 183.01, 183.16, 183.19, 200.68, 200.69

[56] References Cited

U.S. PATENT DOCUMENTS

| | | | |
|---|---|---|---|
| 4,577,066 | 3/1986 | Bimonte et al. | 379/221 |
| 4,920,529 | 4/1990 | Sasaki et al. | 370/218 |
| 4,956,835 | 9/1990 | Grover | 370/228 |
| 5,146,452 | 9/1992 | Pekarske | 370/228 |
| 5,187,740 | 2/1993 | Swaim et al. | 379/209 |
| 5,233,600 | 8/1993 | Pekarske | 370/228 |
| 5,335,268 | 8/1994 | Kelly, Jr. et al. | 379/112 |
| 5,435,003 | 7/1995 | Chng et al. | 395/182.02 |
| 5,459,716 | 10/1995 | Fahim et al. | 370/228 |
| 5,463,615 | 10/1995 | Steinhorn | 370/221 |
| 5,537,532 | 7/1996 | Chng et al. | 395/182.02 |
| 5,636,203 | 6/1997 | Shah | 370/244 |
| 5,646,936 | 7/1997 | Shah et al. | 370/228 |
| 5,734,640 | 3/1998 | Johnson | 370/228 |

FOREIGN PATENT DOCUMENTS

| | | |
|---|---|---|
| 0 494 513 A2 | 12/1991 | European Pat. Off. |
| WO 95/10149 | 4/1995 | WIPO. |

OTHER PUBLICATIONS

Hezberg et al. "The Hop–Limit Approach for Spare–Capacity Assignment in Survivable Networks" IEEE Dec. 3, 1995.
Dighe et al. "A Link Based Alternative Routing Scheme for Nework Restoration under Failure" IEEE May 1995.
Grover et al. "Near Optimal Spare Capacity Planning in a Mesh Restorable Network" IEEE Jan. 1991.
Hasegawa et al. "Dynamic Reconfiguration of Digital Cross--Connect Systems with Network Control and Management" IEEE.
Bellary, et al. "Intelligent Transport Network Survivability: Study of Distributed and Centralized Control Techniques" IEEE 1990.
Shimazaki et al. "Neopilot: An Integrated ISDN Fault Management System" IEEE Feb. 1990.
Shimazaki et al. "Network Fault Management" Sep. 1992.
Newport, et al. "Network Survivability Through Connectivity Optimizaiton" IEEE 1987.

(List continued on next page.)

*Primary Examiner*—Alpus H. Hsu

[57] ABSTRACT

A method and apparatus for analyzing a telecommunications network and providing data based on such analysis first receives physical topology data for the network based on nodes and their connections in the network. Thereafter, the method and apparatus identify several inter-node configurations in the network. Preferably, the method and apparatus identify six inter-node configurations: stranded network non-rings, non-ring network spurs, stranded network rings, spur nodes with path diversity, network segments with pass-through nodes, and network segments without pass-through nodes. From these six identified inter-node configurations, the method and apparatus identify failure spans or maximum lengths in a network that can be singularly restored. As a result, the six identified inter-node configurations or failure spans can be employed to reduce the processing time required under network restoration systems, and thus can be used to minimize the time required to isolate a failure and generate a restoral route in the network.

27 Claims, 9 Drawing Sheets

OTHER PUBLICATIONS

Flanagan et al. "Principles and Technologies for Planning Survivability–A Metropolitan Case Study", IEEE 1989.

M. Wehr "Protection of Synchronous Transmission Networks", Commutation and Transmission, No. 4, 1993.

Coan, et al. "Using Distributed Topology Update and Pre-planned Configurations to Achieve Trunk Network Survivability" IEEE Oct. 1991.

Manione et al. "An Inconsistencies Tolerant Approach in the Fault Diagnosis of Telecommunications Networks" Feb. 14, 1994.

Bouloutas, et al. "Alarm Correlation and Fault Identification in Communication Networks" Feb. 1, 1994.

Network spurs – Non-rings

Stranded Network – Rings

Spur Nodes with diversity

METHOD AND APPARATUS FOR DETERMINING MAXIMUM NETWORK FAILURE SPANS FOR RESTORATION

TECHNICAL FIELD

The present invention relates to analyzing communication systems, including analyzing systems for restoration after a network suffers from an unplanned outage or break in a signal path.

BACKGROUND OF THE INVENTION

In the telecommunications field, particularly in long distance networks, long distance network providers continually strive to increase the traffic carrying capability of their transmission medium. For example, since fiber optic cables have increased bandwidth over known twisted pair or copper wire cables, fiber optic cables are used increasingly for connecting network stations and other network elements. As a result, a greater number of stations or network elements can be connected over a fewer number of fiber optic cables, as opposed to prior cables.

Unfortunately, if one or more of the fiber optic cables fail, massive disruption of services to a large number of network customers and users can result. Network service providers or telecommunications carriers therefore strive to quickly and economically restore traffic effected by these disruptions or "outages." Restoring network outages generally requires four steps: (1) detecting the network failure, (2) isolating the location of the failure in the network, (3) determining a traffic restoral route, and (4) implementing the restoral route. Network restoration must be executed quickly to ensure minimal interruption of network traffic. Therefore, nearly all telecommunications carriers wish to restore traffic within a few seconds or less. The telecommunications carriers typically restore the highest priority network elements first, and as many of such elements as possible within a short period of time.

Currently, telecommunications carriers simulate possible failures, determine restoral routes, and develop a "pre-plan" by collecting large amounts of data reflecting the logical topology of the network. The collected data is often retrieved from network engineering databases which reflect the logical construction of the network, such as indicating the connections and paths of all network traffic trunks. An engineer or network analyst analyses the collected data, compares the collected data to the geographic or physical layout location of the network, and then generates the pre-plans therefrom. Since the pre-plans are developed prior to any failure in the network, when a failure does occur, a plan already exists for restoring traffic affected by the failure. In general, a pre-plan corresponds to a segment of the network that can incur a failure. If that segment fails, then the corresponding pre-plan is retrieved, and its restoral route implemented.

To determine where in the network a failure has occurred, a central location often receives various alarms from the network, which are generated in response to the failure. With the aid of numerous algorithms performed to correlate the various alarms based on trunk topology, the analyst must then match the alarms to a physical network topology to isolate the location of the failure within the network. After locating the failure, the analyst can then identify the appropriate pre-plan. For example, by locating the failure on a physical map of the network, the analyst can then identify an alternative route that restores all failed traffic, without sacrificing other traffic or creating new outages. Locating a failure within the network requires extensive processing, particularly with large networks. Such extensive processing necessarily requires processing time, and therefore increases the delay in restoring the network following the failure.

Telecommunications carriers have handled network outages by simulating different failure scenarios in advance. Based on the scenarios, the telecommunications carriers establish scenarios with appropriate instructions (or pre-plans) that can be used at various stations of the network to establish restoral routes to recover from the network outage. Since the number of possible failures in a network necessarily increases as the size of the network increases, a large number of pre-plans are required. Furthermore, since technological improvements allow network topologies to change relatively quickly and easily, and as a network grows, such networks are not static. As a result, pre-plans must be continually be reevaluated, and new pre-plans created.

SUMMARY OF THE INVENTION

The present invention enhances network restoration processes by providing an automated method of determining and representing the maximum spans in a network that can be restored with a single restoration route (i.e., failure spans). The failure spans can be used to maximize the efficiency of isolating network failures, and to determine optimal restoral routes and restoration pre-plans. Failure spans, consisting of one or more links, are identified under the present invention in a sequential list of processes that ensure each failure span in the network is of a maximum length.

The inventor has determined that to minimize the time needed to restore the network following an outage, all aspects of the restoration process should be of maximum efficiency, including the steps of isolating failures and determining restoral routes. The processing, and thus, time, required to isolate a network failure should be minimized. The inventor has determined that this processing can be minimized by minimizing the algorithms which must be performed to correlate the various alarms with the network or trunk topology data. Likewise, the process of determining restoral routes can be made more efficient by minimizing the number of restoral routes needed. By minimizing the number of restoral routes, the restoration systems require less processing time during a network failure.

The present invention preferably employs topology data representing the physical network, and processes each link successively until all links and/or nodes in the network have been processed. Each link is preferably assigned to one and only one failure span. Failure spans consisting of one or more links are preferably identified in a sequential set of processes that ensure each failure span is of the maximum length. Six categories of network spans can be defined: stranded network non-rings, network spur non-rings, stranded network rings, spur nodes with path diversity, network segments with pass-through nodes, and network segments without pass-through nodes. Each failure span likely falls into one of these six categories. As the present invention processes each link in the network, the invention preferably defines spans of links and assigns each link to one of the six categories of the network. Each category is processed sequentially in a specific order to ensure that each link in the network is assigned to one and only one failure span, and that each failure span is of a maximum length in terms of number of links.

In sum, the present invention embodies a method and apparatus for analyzing a telecommunications network and providing data based on such analysis. The invention first receives physical topology data for the network based on nodes and their connections in the network. Thereafter, the invention identifies several inter-node configurations in the network. Preferably, the invention identifies the six inter-node configurations: stranded network non-rings, non-ring network spurs, stranded network rings, spur nodes with path diversity, network segments with pass-through nodes, and network segments without pass-through nodes. From these six identified inter-node configurations, the invention identifies failure spans or maximum lengths in a network that can be singularly restored. As a result, the six identified inter-node configurations or failure spans can be employed to reduce the processing time required under network restoration systems, and thus can be used to minimize the time required to isolate a failure and generate a restoral route in the network.

The present invention embodies a method for analyzing a network, where the network has a plurality of communication paths coupling a plurality of nodes. The method includes the steps of (a) receiving network data from each of the plurality of nodes and paths intercoupling the nodes; (b) identifying a plurality of different inter-node configurations based on the received network data; and (c) determining a plurality of network spans from the identified inter-node configurations in the network.

The present invention also embodies an apparatus in the network having a storage device and a computer system. The storage device has stored therein network data representing each of the plurality of nodes and paths intercoupling the nodes. The computer system is coupled to the storage device and receives the network data. The computer system identifies a plurality of different inter-node configurations based on the received network data, and determines a plurality of network spans from the identified inter-node configurations in the network.

DETAILED DESCRIPTION OF THE INVENTION

A telecommunications network, and in particular, a method and apparatus for analyzing the network, is described in detail herein. In the following description, numerous specific details are set forth such as ordering and execution of steps under an analysis routine, certain steps for analyzing portions of a network, etc., in order to provide a thorough understanding of the present invention. One skilled in the relevant art, however, will readily recognize that the present invention can be practiced without the specific details, or with other specific steps in a routine, etc. In other instances, well-known structures and steps are not shown or described in detail in order to avoid obscuring the present invention.

Figure 1:
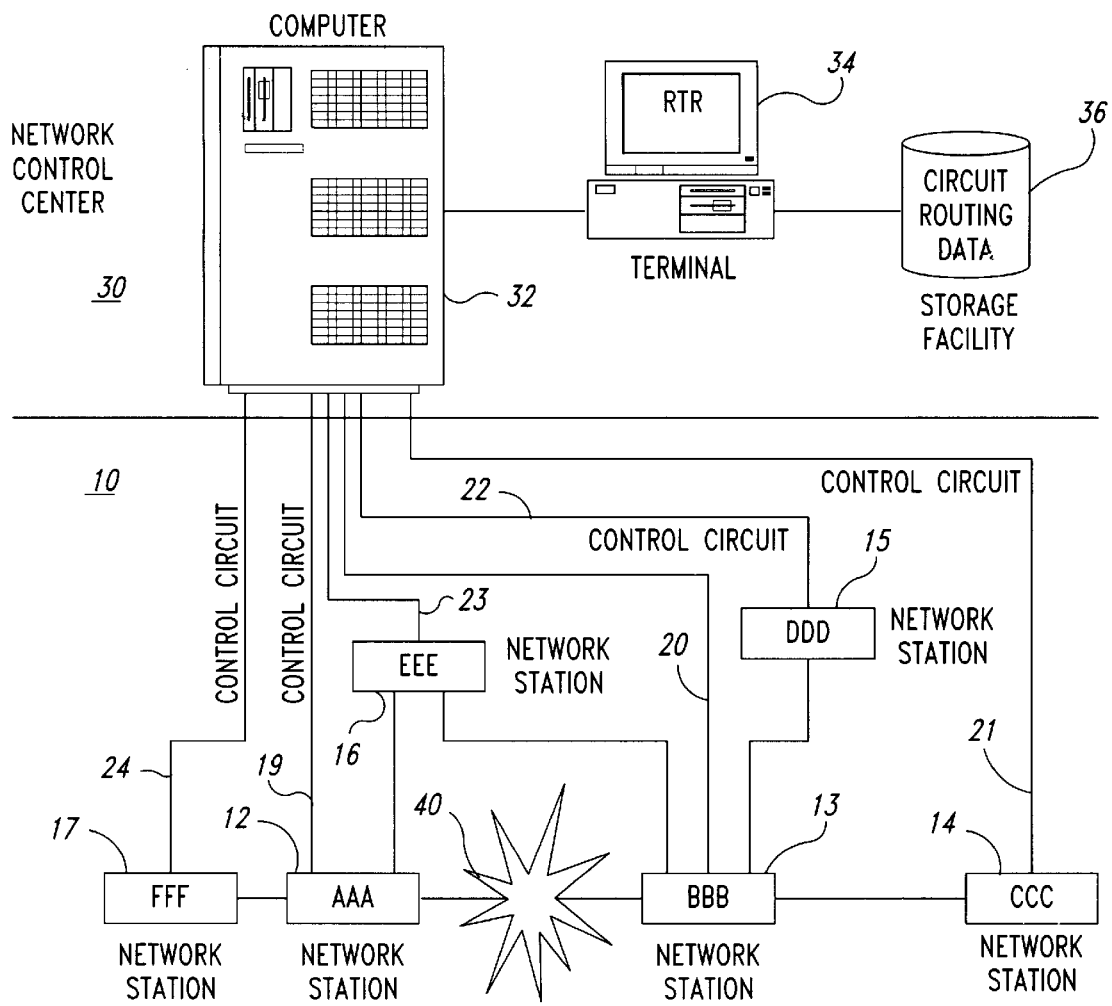
FIG. 1 is a block diagram of a portion of a network, including a network control center.

Referring to FIG. 1, a simplified telecommunication system is shown to help understand the present invention. As shown in FIG. 1, a telecommunications network 10 includes interconnected network stations or nodes AAA, BBB, CCC, DDD, EEE, and FFF, designated as stations 12–17, respectively. A "node" as used generally herein, refers to a physical link in a network, representing a terminal or system which may serve any of a number of functions. For example, each node can include digital cross connect (DXC) systems, multiplexing equipment, line termination equipment, and/or fiber transmission systems. A DXC system is a complex digital switch capable of automatically switching trunks based on external commands. A "trunk," as generally used herein, is a logical channel of communications capacity that traverses one or more nodes and one or more links between nodes (e.g., DS-0, DS-1, DS-3, etc.). Line termination equipment and fiber transmission systems typically include light-to-electricity transducers and/or multiplexers, as is known in the art.

Under normal conditions, communications traffic is routed between the network nodes 12–17 along trunks, and between these and other network nodes of the larger network 10 of which the portion shown in FIG. 1 forms a part thereof. Each node typically has a unique address or other designation in the network 10. In addition, each node 12–17 is connected by control circuits 19–24, respectively, to a network management or control center 30. The control circuits 19–24 may each be an X0.25 circuit, which is a known circuit for carrying control communications between the associated node and the network control center 30.

The network control center 30 includes a computer 32 and a terminal 34 for interacting with the computer 32, which provides an interface for human interaction. The network control center 30 also includes a storage facility 36 for storing network and circuit routing data, topology data, pre-plans, etc. Several of such network control centers 30 can be distributed throughout the network 10.

When an outage or disruption of telecommunications traffic occurs, such as a failure 40, the nodes 12–17 that couple to trunks or circuits impacted by the disruption recognize the disruption. In response to the recognized disruption, two or more of the nodes 12–17 generate alarms that are sent over the control circuits 19–24 to the network control system 30. From these alarms, the network control system 30 determines the location of the outage. Preferably, the network control system 30 performs failure locating routines, including routines described in detail in the inventor's copending U.S. patent applications entitled "Method and Apparatus for Isolating Network Failures by Correlating Paths Issuing Alarms with Failure Spans," and "Method and Apparatus for Isolating Network Failures by Applying Alarms to Failure Spans," filed concurrently herewith, and which are incorporated by reference herein.

Under appropriate routines, such as those of the copending applications, the computer 32 retrieves from the storage facility or device 36 information about the impacted circuits including the paths that they follow and the equipment they pass through at different nodes along the paths. Based on this data, the network control system 30, or a network analyst, can implement a pre-plan and/or restore telecommunications traffic on the network despite the outage. The process of locating failures within the network 10, and developing and/or implementing pre-plans or restoral routes is made more efficient by identifying failure spans under the present invention, as described in detail herein.

The network control center 30 or the analyst implements the alternative routes in the network 10 by establishing new connections via commands transmitted through the control circuits 19–24, or alternatively, depending upon the equipment employed at the nodes 12–17, by other means of transmission to effect or direct manual actions to be taken at the nodes. For example, spare high bandwidth DS-3 trunks typically exist throughout the network 10, which can be employed to restore an outage in the network. The network 10 is most effectively restored when the nodes 12–17 employ DXC systems that can automatically switch from one trunk to another based on commands from the network control center 30.

Figure 2:
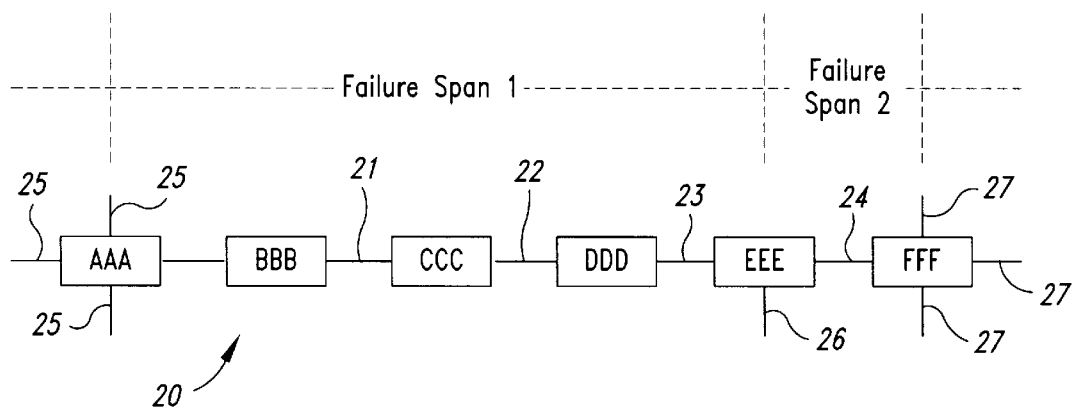
FIG. 2 is a block diagram of a first alternative portion of the network of FIG. 1.

Referring to FIG. 2, an exemplary network portion 20 of the network 10 is shown as having nodes designated as AAA, BBB, CCC, DDD and EEE. The nodes AAA and BBB are coupled by a link 21, the nodes BBB and CCC coupled by a link 22, the nodes CCC and DDD coupled by a link 23, and the nodes DDD and EEE coupled by a link 24. A "link," as generally used herein, is a physical connection between two nodes, representing any type and any capacity of communications between the nodes. A single link usually consists of multiple trunks, and a single trunk consists of one or more links that span multiple nodes. In general, most high capacity networks contain far more trunks than links. The links 21–24, and other links described in detail herein, consist of any type and capacity of traffic trunks.

The nodes BBB and CCC of the network portion 20 of FIG. 2 are simply pass-through nodes. As generally used herein, a "pass-through node" is a node with only two links for which all trunks entering the node leave the node on another link, so that no switching or terminating of traffic occurs. In other words, the number of trunks entering the node equals the number of trunks leaving the node; there are no terminating or diverging trunks at that node, as is described more fully below. A pass-through node can include a digital repeater or generator. Identifying pass-through nodes is important for restoration plans under the present invention because if a failure occurs between nodes AAA and DDD, then only a single restoration plan or pre-plan is needed for the links 21–23 between nodes AAA and DDD, as described below.

The nodes AAA, DDD, and EEE in the network portion 20 represent more significant functions in the network 10. Traffic entering the node AAA on the link 21 has three distinct links 25 on which the traffic may leave the node. Similarly, traffic entering the node EEE on the link 24 can leave the node on one of three links 27. Traffic entering the node DDD on the link 23 can leave the node on the link 24, or on a link 26.

Within the nodes AAA, DDD and EEE, various functions, such as cross-connecting and multiplexing, can occur that determine which link certain incoming traffic takes out of the given node. Importantly, the traffic entering the nodes AAA, DDD and EEE is not necessarily equal to the traffic leaving that node on any other link. For example, traffic entering the node DDD over the link 23 does not equal the traffic leaving the node DDD on the link 24; some of the traffic could instead leave the node over the link 26.

In general, the links 21–27 that enter and leave the nodes AAA, DDD and EEE in the portion 20 of the network 10 can represent either diverging trunks or terminating trunks. "Diverging trunks" are trunks that enter a node and are demultiplexed and switched (e.g., via an M13 multiplexer and a DXC system) within the node so that the traffic may leave the node on a different trunk. A "terminating trunk" is a trunk that leaves a node but does not go to another node. In sum, the trunk terminates at that node, and represents traffic leaving the network 10. A non-terminating trunk refers to a trunk that leaves a node and reaches another node without terminating. Either diverging or terminating trunks at a given node indicate that that node will be an end node of a failure span, and distinguishes that node from a pass-through node. For example, a DS-3 trunk may enter the node AAA over the link 21, and individual DS-1 trunks may take different DS-3 trunks out of the node over the links 25 by means of a DXC 3/1 multiplexer at the node. The egress trunks, on the links 25, may then go to other nodes in the network 10.

Prior network systems employed distinct restoration plans for segments AAA–BBB, BBB–CCC, and CCC–DDD. A "segment," as generally used herein, is a single portion of a trunk that spans between two adjacent nodes, or in other words, is a single link of a single trunk. Such prior restoration plans, however, required additional time-consuming processes, and are thus unnecessary under the present invention. Since the traffic to the immediate left of the node BBB equals the traffic to the immediate right of the node CCC (i.e., no terminating/diverging trunks), the segments AAA–BBB, BBB–CCC and CCC–DDD do not require separate restoration plans.

Rather than analyzing trunks or segments within the network 10, the present invention analyzes links within the network. By analyzing the links within the network 10 and identifying certain inter-node configurations such as pass-through nodes, the present invention can readily determine the maximum network spans or "failure spans" that require restoration, thereby minimizing the number of restoration plans needed for the network 10. As generally used herein, a "failure span" is a span of the physical topology of the network, consisting of one or more links, having a singular point of failure in which all traffic carried by the span may be restored by a single plan. A failure span is a maximum length of the network 10 (in terms of nodes and links) that can be singularly restored.

Therefore, for the example of the portion 20 of network 10 shown in FIG. 2, the present invention will determine a failure span as consisting of the span between the nodes AAA and DDD. This span, shown as "Failure Span 1" in FIG. 2, can be treated as a single route needing restoration if a failure occurs anywhere along this span. While prior art systems may designate a failure span from the node AAA to the node BBB, this is not as efficient because it will introduce more failure spans in the network, and thus require more restoration plans. Such prior systems thus require greater granularity in isolating a failure in the network 10, as discussed below. Any failure occurring on the span between nodes AAA and BBB will require restoration of the entire Failure Span 1 (between nodes AAA and DDD). Therefore, this entire span is designated as the Failure Span 1. As a result, the maximum granularity for which failure isolation must occur in the portion 20 of the network 10 is between nodes AAA and nodes DDD.

The Failure Span 1 cannot be extended any further than the node AAA or the node DDD, because beyond these two nodes the traffic diverges and will therefore require different restoration spans. The single link 24 between the nodes DDD and EEE is designated as "Failure Span 2," as shown in FIG. 2. The Failure Span 2 is designated as the maximum granularity between the nodes DDD and EEE, because traffic diverges beyond these nodes (i.e., leftward of the node DDD and rightward of the node EEE with respect to FIG. 2).

Figure 3:
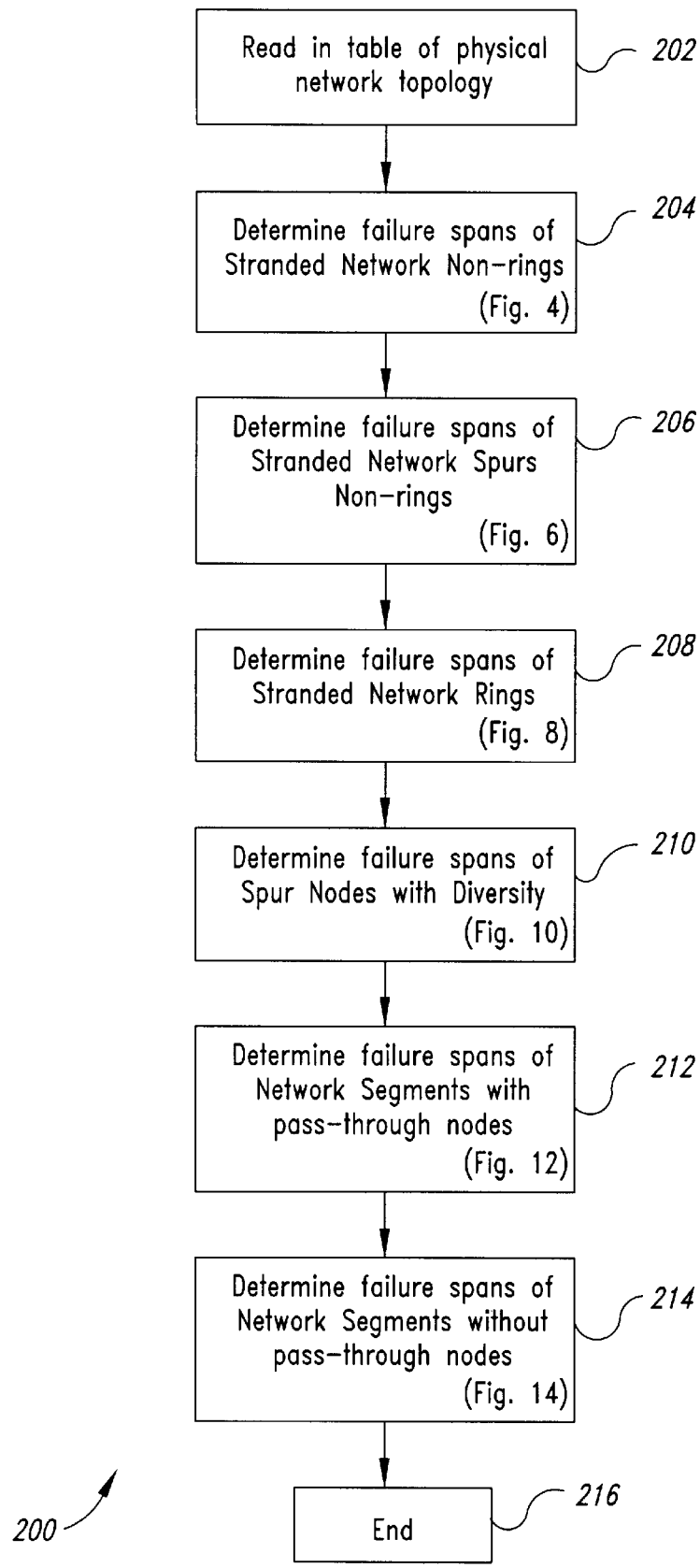
FIG. 3 is an exemplary flowchart diagram of a method for determining maximum failure spans for restoring the network under the present invention.

Referring to FIG. 3, a routine 200 performed by the computer 32 in the network control center 30 identifies six sets of node-to-node relationships, or inter-node connections, in the network 10. The routine 200 can be performed on any type of computer. Beginning in step 202, the computer 32 receives physical network topology data, such as the table of physical network topology data generated by the inventor's copending application entitled "Method and Apparatus for Deriving and Representing Physical Network Topology," filed concurrently herewith, and incorporated herein by reference. The computer 32, for example, receives the physical topology data from the storage facility 36. The physical topology data identifies each node in the network 10, as well as the links between the nodes. By employing the physical topology data, which represents the nodes and their interconnectivity, the present invention can easily distinguish pass-through nodes from nodes in which traffic diverges. Nodes at which traffic diverges contain terminating or diverging trunks, and thus typically represent one end of a failure span, as noted above.

The physical topology data read or retrieved in step 202 preferably includes an indication of terminating trunk counts for each node, such as a table of physical topology data derived under the inventor's copending U.S. Patent Application "Method and Apparatus for Deriving and Representing Physical Network Topology." The terminating trunk count is important because a trunk terminating at a node will not have another node linked to that trunk. As a result, a terminating trunk count can be the only indication that a node may not be a pass-through node.

After receiving the physical topology data., the computer 32 under the steps 204–214 identifies the following six inter-node connections: stranded network non-rings, non-ring network spurs, stranded network rings, spur nodes with path diversity, network segments with pass-through nodes, and network segments without pass-through nodes. After identifying each of such inter-node connections, the computer 32 under the steps 204–214 determines a maximum failure span for the identified inter-node connections.

Figure 4:
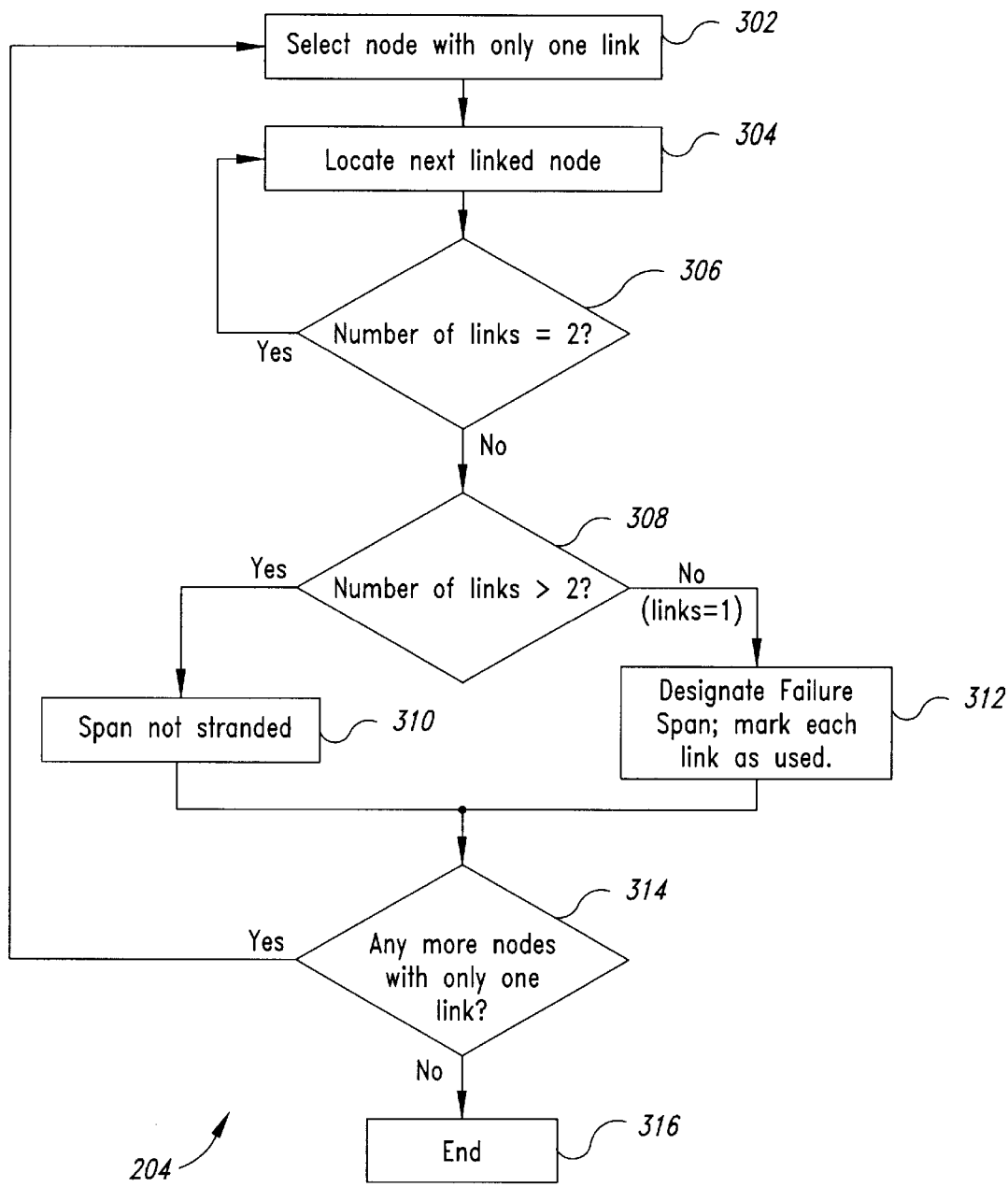
FIG. 4 is a flowchart diagram of a subroutine for identifying stranded network non-rings under the present invention.
Figure 5:
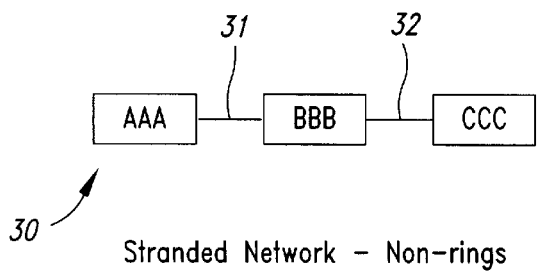
FIG. 5 is a block diagram of an exemplary portion of the network having a stranded network non-ring.

Therefore, in step or subroutine 204, the computer 32 first identifies and determines failure spans for stranded network non-rings. Referring to FIG. 4, the subroutine 204 is shown in greater detail. In general, a "stranded network" portion refers to a portion of the network 10 that is not connected to the rest of the network, under a given level of granularity. Referring to FIG. 5, a portion 30 of the network 10 having a stranded network non-ring is shown. The portion 30 has nodes AAA and BBB coupled by a link 31, and nodes BBB and CCC coupled by a link 32. The nodes AAA–CCC are stranded because they may be intercoupled by DS-3 trunks on the links 31 and 32. However, the portion 30 of FIG. 5 could be coupled to the remaining network 10 over lower capacity trunks, such as DS-1 trunks. Therefore, when analyzing the network 10 under a level of granularity which consists of only DS-3 or higher bandwidth trunks, the portion 30 of FIG. 5 is considered "stranded" from the remaining portions of the network 10. Stranded network portions can consist of either non-rings as shown in FIG. 5, or rings as described below.

Therefore, beginning step 302, the computer 32 reads or selects physical topology data that identifies a node in the network 10 having only one link. For example, in the portion 30 of FIG. 5, the nodes AAA and CCC each have only one link. A node having only one link can indicate the beginning of a failure span within the stranded network non-ring category.

In step 304, the computer 32 locates the next node that is coupled to the node selected in step 302. Therefore, the computer 32 reads the physical topology data to locate a node that is coupled to the selected node. If the node selected under step 302 is the node AAA, then the computer 32 in step 304 reads the physical topology data from the storage facility 36 of the network 10 and locates the node BBB.

In step 306, the computer 32 determines whether the second node located under step 304 has exactly two links. In other words, the computer 32 determines whether the node located under step 304 is a pass-through node. As shown in FIG. 5, the node BBB is indeed a pass-through node, since only one link 31 enters the node, while only one link 32 leaves the node.

A pass-through node is not the end of a failure span, therefore, the computer 32 loops back to the step 304 if the first node located in step 304 has two links. The computer 32 locates the next node as it performs the step 304 a second time. For the example of FIG. 5, the computer 32 then locates the node CCC. In step 306, the computer 32 determines that the node CCC does not have exactly two links (rather than only 1), and thus, in step 308, the computer determines whether the number of links for the node CCC is greater than two. If the node has greater than two links, then in step 310, the computer 32 determines that the currently selected span is not stranded. In other words, the node CCC could be coupled to the remaining portions of the network 10. Alternatively, if the node has greater than two links under step 308, then the node selected under step 302 could be a network spur node of a stranded network ring, as discussed below.

If, however, the computer 32 determines that the number of links is not greater than two for the node CCC in step 308, then the node CCC must have only one link. Therefore, in step 312, the computer 32 designates the node CCC as the opposite end node of a failure span. As a result, the failure span extends between the node identified in step 302, through the nodes identified in step 304, to the last node identified under step 312. Therefore, for the example of FIG. 5, the failure span extends from the node AAA to the node CCC.

In step 312, the computer 32 also marks each link in the designated failure span as "used." Each time that a link is assigned to a failure span under the present invention, it is marked as used, so that it is passed over or ignored in subsequent processing of nodes and links in the network 10. More importantly, by marking the link as used, the present invention does not assign that link to another failure span, thereby avoiding redundant failure spans. Therefore, the present invention processes only unused links under each step of the routines described in detail herein. Marking a link as used, however, does not alter the link count for the nodes to which the link is coupled.

Whether the subroutine 204 branched to step 310 or step 312, the particular search for a failure span in a stranded network non-ring that began with a single node selected in step 302 ends. In step 314, the computer 32 determines whether any more nodes having only one link exist in the network 10. In other words, the computer 32 analyzes the physical topology data to identify any additional nodes having only one link, and where that one link has not been marked as used. If another node having only one unused link is identified in the physical topology data, then the subroutine 204 loops back to step 302, and the computer 32 again performs steps 302–314 to identify other stranded network non-rings. When all nodes having only one link have been processed by the computer 32, then the subroutine 204 ends in step 316 and the computer returns to the main routine 200 of FIG. 3.

Figure 6:
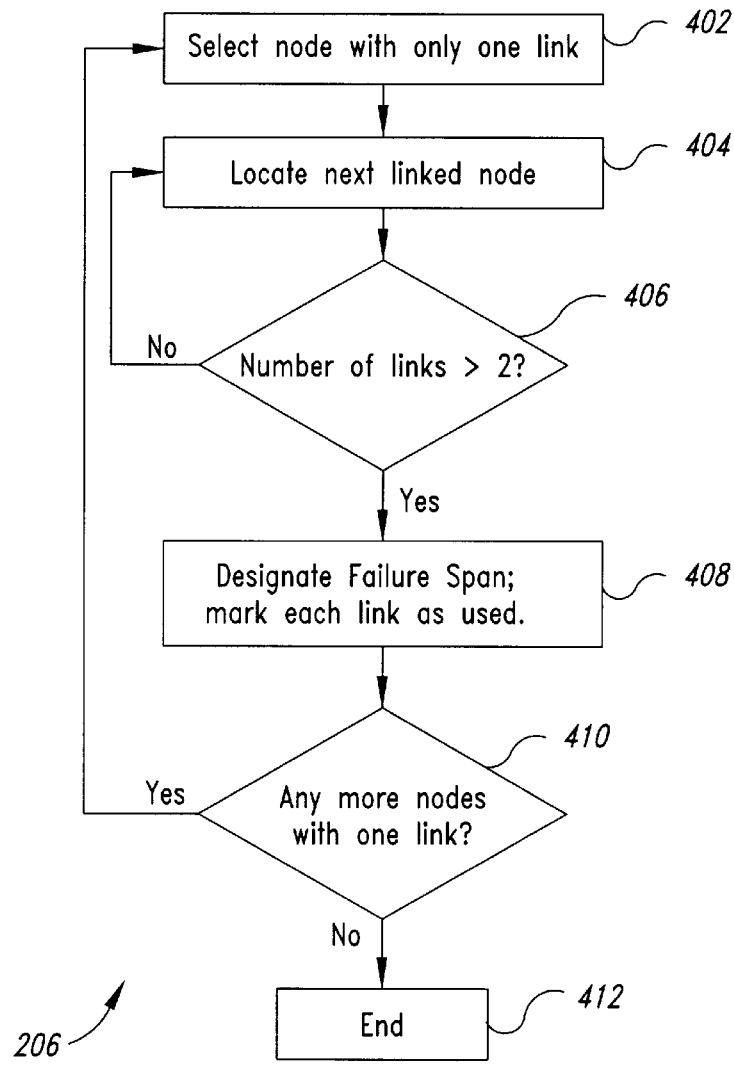
FIG. 6 is a flowchart diagram of a subroutine for identifying non-ring network spurs under the present invention.

Referring back to FIG. 3, the computer 32 in step or subroutine 206 identifies, and determines failure spans for, non-ring network spurs. In other words, under the subroutine 206, the computer 32 processes through each portion of the network 10, based on the physical topology data, to identify those failure spans that consist of non-ring network spurs, which have unused links. Referring to FIG. 6, the subroutine 206 for identifying and determining failure spans for non-ring network spurs is shown in greater detail.

Figure 7:
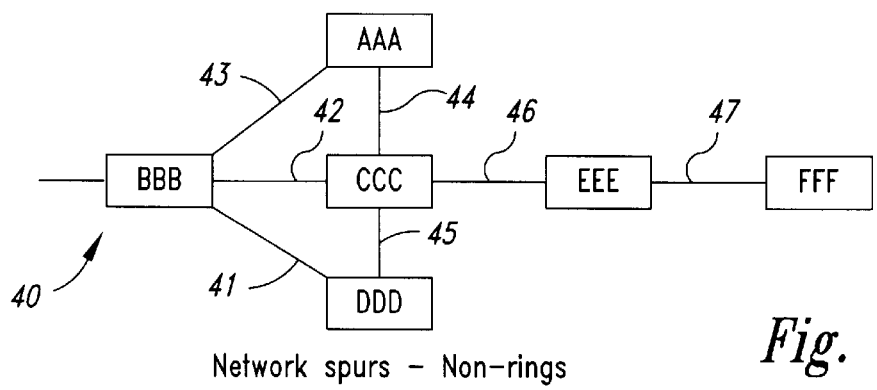
FIG. 7 is a block diagram of an exemplary portion of the network having a non-ring network spur.

A "spur" is a portion of the network 10 that is linked to the overall network via only one link. It can consist of a ring or a non-ring. Referring to FIG. 7, an exemplary non-ring network spur is shown as part of a network portion 40 forming part of the network 10. As shown in FIG. 7, the portion 40 consists of a node AAA coupled to nodes BBB and CCC by links 43 and 44, the node BBB coupled to nodes CCC and DDD by links 41 and 42, nodes EEE and FFF coupled by a link 47, and links 45 and 47 that couple the node CCC with the nodes DDD and EEE, all respectively.

Referring to FIG. 6, the computer 32 begins the subroutine 204 in step 402 by first selecting a node in the network 10 having only one unused link from the physical topology data. For example, the computer 32 under step 402 selects the node FFF in the network portion 40 of FIG. 7. As noted above, a node with only one link generally indicates the beginning of a failure span that may fall into the non-ring network spur category.

In step 404, the computer 32 analyzes the physical topology data to locate the next node linked with an unused link to the node identified in step 402. For the exemplary network portion 40 of FIG. 7, the next node identified in step 404 is the node EEE. In step 406, the computer 32 determines whether the next node determined in step 404 has greater than two links. If it does not, then the computer 32 assumes that this next node has exactly two links. If the currently examined span were coupled to the currently examined node with one link, then it would be a stranded network non-ring. Consequently, it would have been identified under the subroutine 204 (FIG. 3). As a result, since the currently examined node has only two links, the node is a pass-through node, such as the node EEE in FIG. 7. The computer 32 performs the steps 404 and 406 continually until all passthrough nodes have been located, or until a node having greater than two links is encountered.

When the computer 32 in step 406 encounters a node having greater than two links, then in step 408 the currently examined node indicates the end node of a failure span for non-ring network spurs. For example, after performing the steps 404 and 406 for the node EEE, the computer 32 locates the node CCC in step 404, and determines that the node CCC has greater than two links in step 406. Therefore, in step 408, the computer 32 determines that the node CCC is the end node for the failure span extending between the node FFF and the node CCC. The computer 32 in step 408 identifies this failure span as a non-ring network spur, and marks the links 46 and 47 as used.

Thereafter, in step 410, the computer 32 determines if any additional nodes exist in the network 10 having only one link, in which that link has not yet been marked as used. If so, the computer 32 again performs the steps 402–410 to identify additional non-ring network spurs as failure spans, and marks the links therealong as used. Thereafter, in step 412, the subroutine 206 ends, and the computer 32 returns to the main routine 200 of FIG. 3.

After performing the steps of subroutines 204 and 206, the computer 32 has, in general, identified all nodes having only one link within the physical topology data. Under the step or subroutine 208, the computer 32 identifies, and determines failure spans for, stranded network rings. The subroutine 208 is shown in greater detail in FIG. 8. As noted above, a stranded network portion refers to a portion of the network 10 that is not connected to the rest of the network. A stranded network portion can be in the form of rings or non-rings. (Recall, stranded network non-rings were determined under the subroutine 204.)

Figure 9:
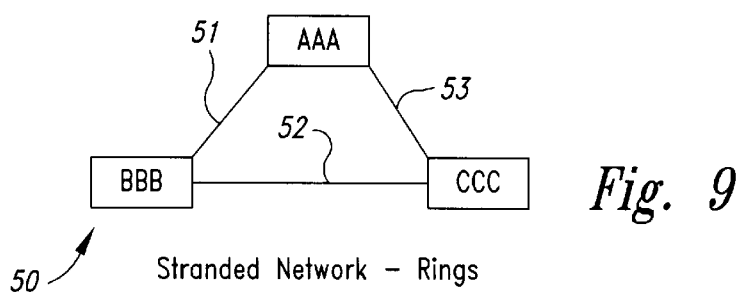
FIG. 9 is a block diagram of an exemplary portion of the network having a stranded network ring.

Referring to FIG. 9, an exemplary stranded network ring 50 is shown. The stranded network ring 50 includes a node AAA coupled to nodes BBB and CCC by links 51 and 53, respectively. The nodes BBB and CCC are coupled by a link 52. As a result, the nodes AAA, BBB and CCC form a ring by means of the links 51, 52 and 53. The stranded network ring 50 is stranded from the remainder of the network 10 based on a given level of granularity. For example, the links 51–53 can be high bandwidth DS-3 links, while the ring 50 could be coupled to the remaining portions of the network 10 by way of lower bandwidth DS-1 trunks.

Figure 8:
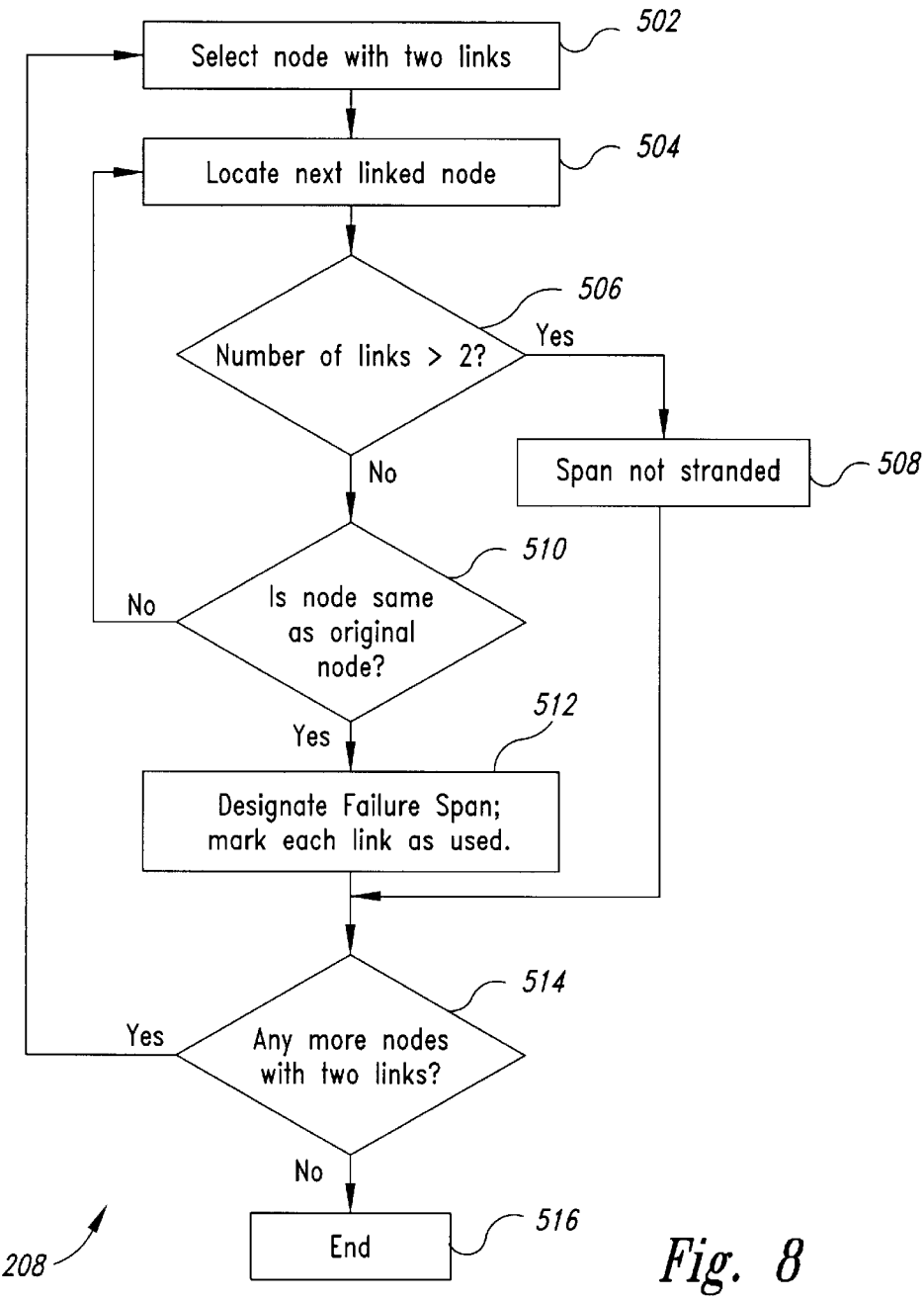
FIG. 8 is a flowchart diagram of a subroutine for identifying stranded network rings under the present invention.

Referring to FIG. 8, the computer 32 begins the subroutine 208 in step 502 by analyzing the physical topology data to select a node having only two unused links. For example, the computer 32 in step 502 selects the node AAA for the portion 50 of FIG. 9. The node AAA selected in step 502 indicates the beginning of a potential failure span that may fall within the stranded network ring category.

In step 504, the computer 32 locates a next node linked with the node selected in step 502. This next located node can be in any direction from the first selected node. For example, for the stranded network ring 50 of FIG. 9, after the computer 32 selects the node AAA in step 502, the computer can locate the node BBB in step 504.

In step 506, the computer 32 determines if the next node located in step 504 has greater than two links. If the next node does have greater than two links, then in step 508 the computer 32 determines that the span currently being examined is not stranded, the search for the current stranded network ring ends and the subroutine jumps to step 514. If, however, the computer 32 in step 506 determines that the next node located in step 504 does not have greater than two links, then in step 510 the computer determines if the next node is the same as the node originally selected in step 502. If it is not, then the subroutine 208 loops back to again perform steps 504–510 to identify the stranded network ring 50, or determine that the particular search is not a stranded ring.

For example, after first locating the node BBB in step 504, the computer 32 then locates the node CCC after again performing the step 504. The node CCC does not have greater than two links under step 506, and the node CCC is not the originally selected node in step 510. Therefore, the computer 32 performs the steps 504, 506 and 510 a third time, where the computer locates the node AAA in step 504, and determines in step 510 that the node AAA was the node originally selected under step 502. Therefore, in step 512, the computer 32 recognizes that the nodes AAA, BBB and CCC form a stranded network ring. The computer 32 designates the stranded network string 50 as a failure span, and marks each link 51–53 as used.

After identifying a stranded network ring in step 512, or determining that the span currently being examined is not stranded in step 508, the computer 32 in step 514 determines whether any more nodes in the network 10 have only two unused links. In other words, the computer 32 again analyzes the physical topology data to locate any nodes having only two unused links. If the computer 32 locates such a node, then the computer again performs the steps of 502–514 as it attempts to designate failure spans for other stranded network rings in the network 10. After the computer 32 determines that no more nodes having only two links exist in the network 10, then in step 516 the subroutine 208 ends and the computer returns to the main routine 200 of FIG. 3.

Referring again to FIG. 3, the computer 32 in step or subroutine 210 identifies, and then determines failure spans for, spur nodes with path diversity. The subroutine 210 is shown in greater detail in FIG. 10. A spur, as noted above, is a portion of a network that is linked to the overall network 10 via one link. A "path," as generally used herein, is a group of one or more trunks that traverse the same physical or geographic route. A link between two nodes that uses two different physical routes (i.e., are separated into two different routes) would constitute two different paths, and as generally used herein, would constitute two different links.

Figure 11:
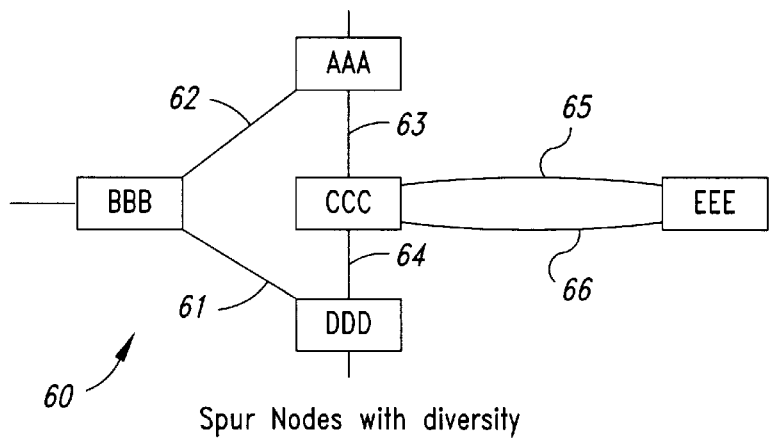
FIG. 11 is a block diagram of an exemplary portion of the network having a spur node with path diversity.

Referring to FIG. 11, an exemplary portion 60 of the network 10 shows a spur node with path diversity. Nodes AAA, BBB, DDD and CCC are coupled together in a ring by links 61–64, as shown in FIG. 11. A node EEE is coupled to the node CCC by two different links 65 and 66. The links 65 and 66, while both coupling the nodes CCC and DDD together, take two different physical or geographic paths therebetween. The node EEE has no other links. As a result, the node EEE is a spur node with path diversity.

Figure 10:
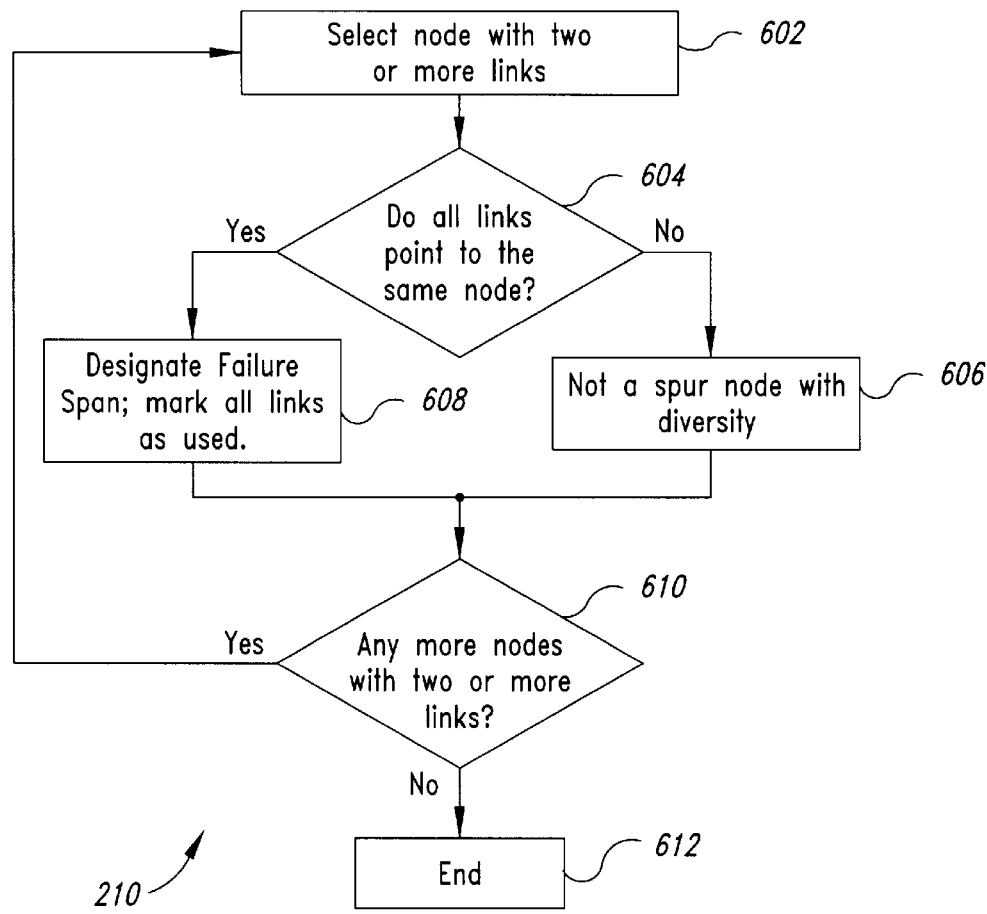
FIG. 10 is a flowchart diagram of a subroutine for identifying spur nodes with path diversity under the present invention.

Referring to FIG. 10, the computer 32 begins the subroutine 210 in step 602 by analyzing the physical topology data which, as noted above, identifies each node in the network 10 and its links with other nodes. In step 602 the computer 32 selects a node that has two or more unused links. For example, the computer 32 in step 602 selects the node EEE for the portion 60 of FIG. 11. The node EEE selected in step 602 indicates the beginning of a potential failure span that may fall within the spur nodes with path diversity category.

In step 604, the computer 32 determines if all links from the node selected in step 602 point to or are coupled to the same adjacent node. If the two or more links coupled to the node initially selected in step 602 do not all couple to the same adjacent node, then the computer 32 determines in step 606 that the currently examined span is not a spur node with path diversity. As a result, the analysis of the current node ends. However, if the node initially selected in step 602 has links that are all coupled to the same adjacent node, then in step 608 the computer 32 designates the span as a failure span. Additionally, in step 608, the computer 32 marks all links for the span as used. For example, the computer 32 in step 604 determines that the links 65 and 66 from the node EEE are both coupled to the node CCC. Therefore, in step 608 the computer 32 designates the span from the node CCC to the node EEE as a failure span, and marks the links 65 and 66 as used.

In step 610, the computer 32 determines whether any more nodes with two or more unused links exist within the network 10. If so, then the computer 32 again performs the steps 602–610 to identify additional spur nodes with diversity. After no more nodes with two or more unused links exist in the physical topology data, the subroutine 210 ends in step 612 and the computer 32 returns to the main routine 200 of FIG. 3.

Referring back to FIG. 3, the computer 32 in step or subroutine 212 identifies, and then determines failure spans for, network segments with pass-through nodes. The subroutine 212 is shown in greater detail in FIG. 12. As noted above, a pass-through node is a node with two links in which all trunks entering the node on one link leave the node on another link. Under the subroutine 212, the computer 32 processes through each part of the network 10 to identify those failure spans that consist of network segments with pass-through nodes.

Figure 13:
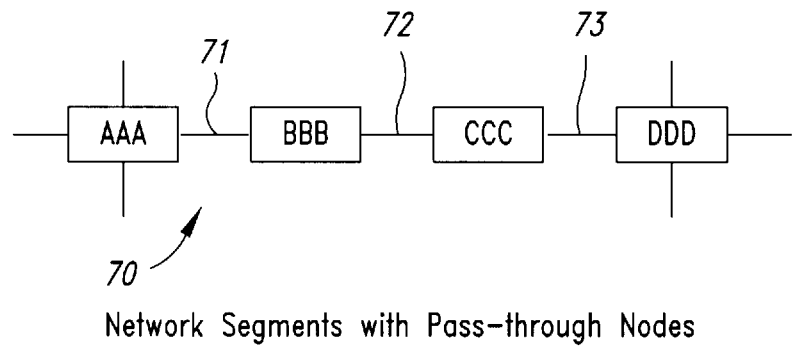
FIG. 13 is a block diagram of an exemplary portion of the network having a network segment with pass-through nodes.

Referring to FIG. 13, an exemplary network portion 70 of the network 10 shows network segments with pass-through nodes. As shown in FIG. 13, a node AAA is coupled to the node BBB by a link 71, the node BBB is coupled to a node CCC by a link 72, and the node CCC is coupled to a node DDD by a link 73. The nodes BBB and CCC each have two links, with no diverging or terminating trunks, and thus are pass-through nodes.

Figure 12:
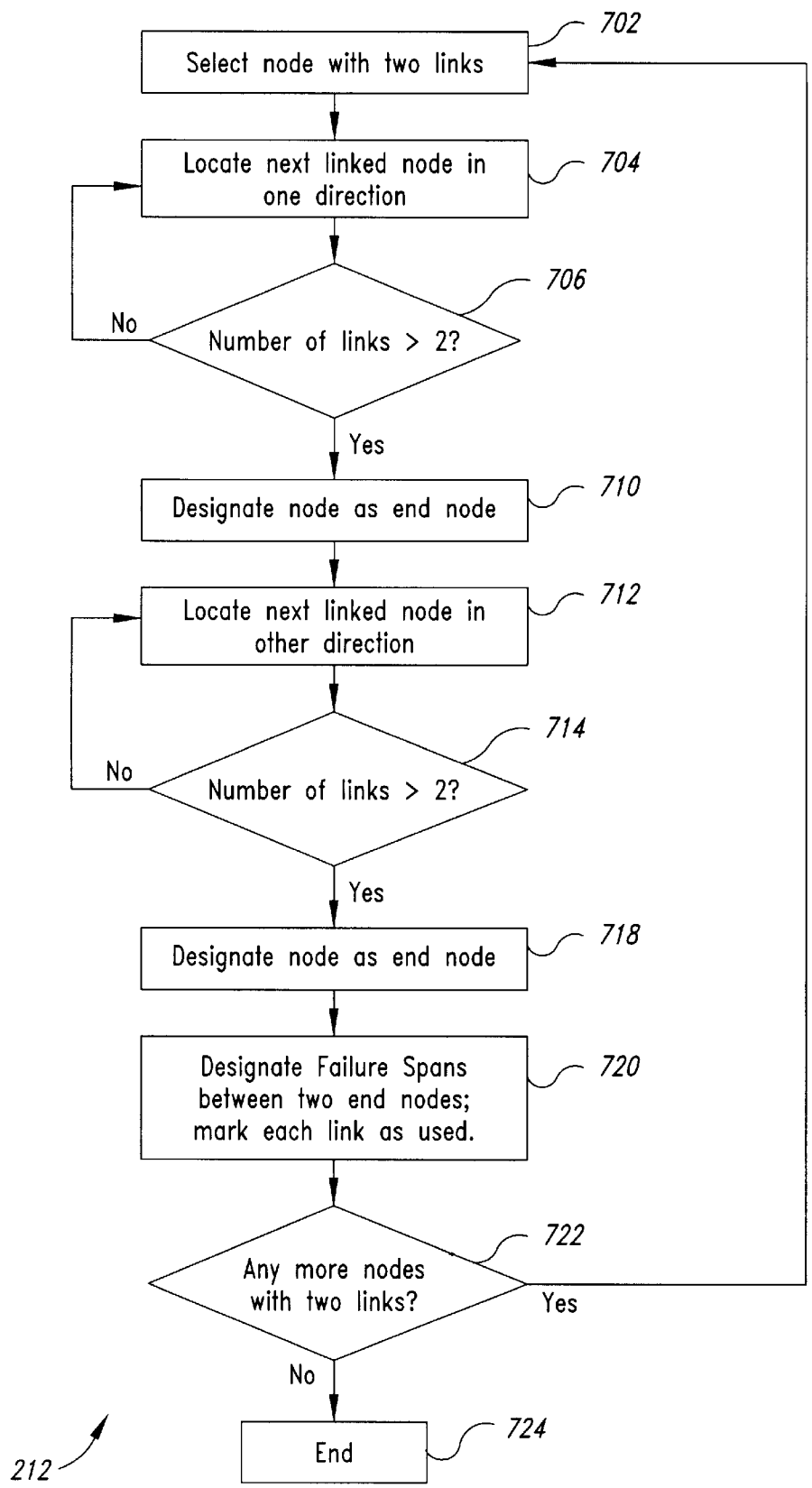
FIG. 12 is a flowchart diagram of a subroutine for identifying network segments with pass-through nodes under the present invention.

Referring to FIG. 12, the computer 32 begins the subroutine 212 in step 702 by selecting a node with exactly two unused links from the physical topology data. Such a node could be a node rejected under the subroutine 210 in step 606 (FIG. 10), or rejected under the subroutine 208 in step 508 (FIG. 8). For example, the computer 32 selects the node BBB from the portion 70 of FIG. 13 under step 702. The node BBB selected in step 702 indicates the beginning of a potential failure span that may fall within the network segment with pass-through nodes category.

In step 704, the computer 32 locates the next linked node in one direction. The selection of the direction is arbitrary, since the other direction will eventually be processed under the subroutine 212. For example, the computer 32 in step 704 locates the node CCC in the direction rightward of the node BBB (with respect to FIG. 13). In step 706, the computer 32 determines whether the newly located node has greater than two links.

If the node does not have greater than two links, then the computer 32 again performs the steps 704 and 706 for the next node in the one direction (e.g., rightward). As a result, after again performing the steps 704 and 706, the computer 32 locates the next node DDD, and determines that the number of links for this node is greater than two. As a result, the computer 32 in step 710 designates the node DDD as a first end node. The node designated in step 710 is one end of a failure span currently being identified under the subroutine 212.

Thereafter, the subroutine 212 generally performs the same steps in the opposite direction from the direction determined in step 704 to identify the other end node for the failure span. Therefore, in step 712, the computer 32 locates the next linked node in the other direction from the node selected in step 702. As a result, for the exemplary portion 70 of FIG. 13, the computer 32 locates the node AAA leftward of the node BBB in step 712.

In step 714 the computer 32 again tests to determine whether the node located in step 712 has more than two links. If the number of links are greater than two for the node located in step 712, then the located node is designated as the other or second end node in step 718. For example, the node AAA has greater than two links under the step 714, and therefore, the computer 32 in step 718 designates the node AAA as the second end node. If additional pass-through nodes existed leftward of the node BBB, then the computer 32 loops through the steps 712 and 714 until the other end node were located in step 718.

In step 720, the computer 32 analyzes a trunk count and designates the links between the two designated end nodes as one or more failure spans. For example, the computer 32 determines that the nodes BBB and CCC lack any terminating trunks. Therefore, the computer 32 designates a single failure span extending from the node AAA to the node DDD. If any intervening nodes have terminating trunks, then the computer 32 designates two or more failure spans extending between the two end nodes. The computer 32 in step 720 also marks the links therebetween as used (i.e., the links 71, 72 and 73).

In step 722, the computer 32 determines whether any additional nodes having two links exist in the physical topology data of the network 10, where the nodes are not marked as used. If so, then the computer 32 again performs the steps 702–722 as it locates additional network segments with pass-through nodes. After performing the subroutines 208, 210 and 212, no nodes having only two links will remain in the physical topology data. After identifying all such nodes, the subroutine 212 ends in step 724 and the computer 32 returns to the main routine 200 of FIG. 3.

Referring back to FIG. 3, the computer 32 in step or subroutine 214 identifies, and determines failure spans for, network segments without pass-through nodes. The subroutine 214 is shown in greater detail in FIG. 14. A network segment without pass-through nodes is generally the smallest or shortest failure span in the network 10.

Figure 15:
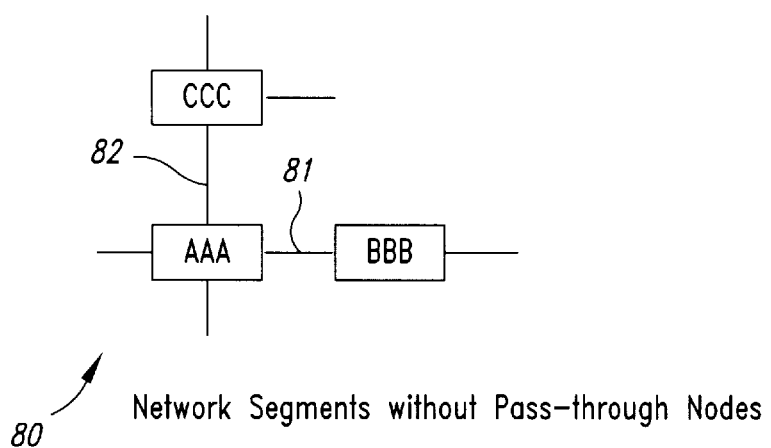
FIG. 15 is a block diagram of an exemplary portion of the network having network segments without pass-through nodes.

Referring to FIG. 15, an exemplary portion 80 shows a network segment without pass-through nodes. The portion 80 consists of nodes AAA and BBB that are coupled by a link 81. A node CCC is coupled to the node AAA by a link 82.

Figure 14:
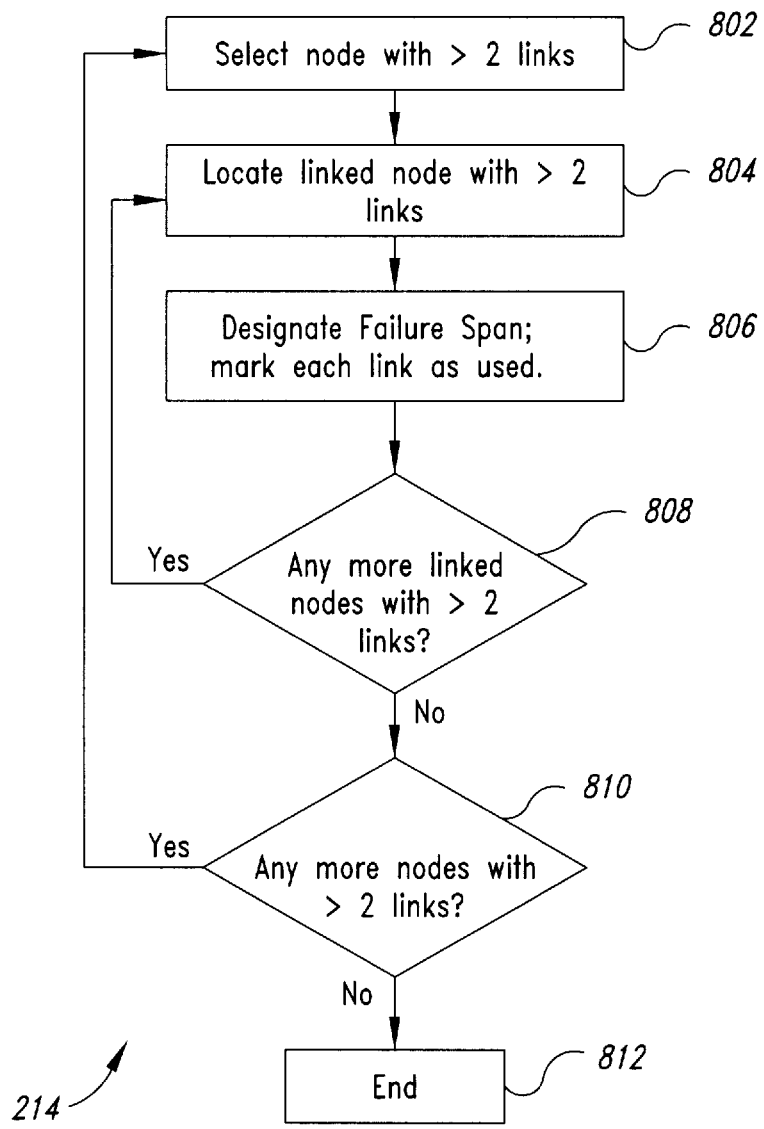
FIG. 14 is a flowchart diagram of a subroutine for identifying network segments without pass-through nodes under the present invention.

Referring to FIG. 14, the computer 32 begins the subroutine 214 in step 802 by selecting a node in the physical topology data having greater than two unused links. Such a node selected in step 802 can be a node rejected under the subroutine 210 in step 606 (FIG. 10). For example, the computer 32 in step 802 selects the node AAA in the portion 80 of the network 10 shown in FIG. 15. The node AAA selected in step 802 indicates the beginning of a failure span which may fall within the network segments without pass-through nodes category.

In step 804, the computer 32 locates the next node having greater than two links which is coupled to the node selected in step 802. For example, the computer 32 in step 804 locates the node BBB. Any node linked to the node selected in step 804 will have more than two links by default because other types of nodes having two or fewer links will previously have been analyzed and marked as used under the previous steps and subroutines. Consequently, in step 806, the computer 32 designates the link formed between the nodes selected and located in the steps 802 and 804 as a failure span. For example, the computer 32 in step 806 designates the link 81 as a failure span. Additionally, under step 806, the computer 32 marks the link as used.

In step 808, the computer 32 determines if any additional nodes exist that are linked with the original node selected under step 802 that have more than two links. If additional nodes exist having greater than two links, one of which is coupled to the node initially selected in step 802, then the computer 32 loops back and again performs the steps 804–808. By default, any node linked to the node originally selected in step 802 by an unused link will have more than two links. For example, the node CCC in the portion 80 is also coupled to the node AAA, and has greater than two links. Therefore, the computer 32 in steps 808 and 804 recognizes from the physical topology data that the node CCC is coupled to the node AAA and has greater than two links. After again performing the steps 804–808, the computer 32 designates the link 82 as a failure span and marks this link as used.

In step 810, the computer 32 determines whether any additional nodes exist in the network 10 that have greater than two unused links. If such additional nodes exist, then the subroutine 214 loops back to step 802, and the computer 32 again performs the steps 802–810. After all nodes in the network 10 having greater than two unused links have been analyzed, the subroutine 214 ends in step 812 and the computer 32 returns to the main routine 200. Referring back to FIG. 3, after performing step 214, the routine 200 ends in step 216. As a result, after the computer has performed the steps or subroutines 202–214, all links in the network 10 will have been assigned to a particular failure span.

After identifying all failure spans in the network 10 under the routine 200, the resulting data can then be output and used in a variety of applications that analyze the network 10 and require data reflecting failure spans in the network. For example, the resulting data can be used to efficiently and quickly isolate and locate failures within the network 10, such as by employing the inventor's above-noted copending U.S. patent applications. Prior art methods of isolating network failures correlate multiple alarms received from various trunks in the network to determine where the failure occurred using logical trunk topology (which represents the routing and interconnection of each trunk). Such prior art methods of isolating failures require extensive processing to eliminate redundant alarms and isolate the exact point of a failure in the network. This extensive processing is necessarily very time consuming.

The present invention provides improved methods of isolating network failures. For example, the granularity of the analysis performed under the routine 200 by the computer 32 can vary. The present invention has generally been described above as analyzing only high bandwidth DS-3 trunks. However, the granularity of the analysis performed under the routine 200 can be increased so as to analyze lower bandwidth trunks such as DS-1 trunks, to thereby recognize additional inter-node connections in the network 10.

Isolating a failure with increasing granularity requires increasing processing and time. As a result, under prior network failure locating methods, increasing the granularity of the process significantly increased the processing and time. The present invention, conversely, maximizes the spans of a network that can be singularly restored (i.e., the invention locates failure spans). As a result, the present invention can sufficiently isolate a failure at a minimum granularity, which minimizes the processing and time required to locate the failure. In other words, the present invention significantly reduces the processing time by maximizing the length of network segments analyzed when isolating a failure. While prior art methods required analysis of multiple segments of multiple trunks, the present invention allows a single failure span to be analyzed, where the failure span includes multiple segments and links of multiple trunks.

After identifying all failure spans in the network 10 under the routine 200, the resulting data can also be used by the computer 32 to prepare pre-plans. Pre-plans, which result in a 1-to-1 correspondence between each failure in the network 10 and a restoral route, can be effectively and efficiently generated by employing the physical network topology data derived under the routine 200 with the inventor's above-noted copending U.S. patent applications and his copending U.S. patent application entitled "Method and Apparatus for Identifying Restoral Routes in a Network," filed concurrently herewith, and incorporated by reference herein. The present invention allows a single failure span to have a corresponding single restoration pre-plan. As a result, each failure span identified under the routine 200 will determine what restoration pre-plan is needed for that portion of the network 10. By maximizing a network span to identify a failure span, the efficiency of restoration pre-plans are maximized, by minimizing the number of pre-plans needed for the network 10. Additionally, the present invention can help to identify portions of the network that require no pre-plans. For example, the non-ring network spurs identified under the subroutine 206 and the spur nodes with path diversity identified under the subroutine 210 may not require pre-plans.

The data produced under the routine 200 can be employed not only in developing pre-plans, but also in developing dynamic route generation. Under dynamic route generation, the computer 32 dynamically calculates a restoral route after detecting and locating a failure, rather than generating a pre-plan prior to such a failure. Dynamic route generation is preferably entirely automatic, without human interaction, and thus can be more efficient and timely than current methods for implementing pre-plans.

The data produced under the routine 200 can be used to maximize the efficiency of determining optimal restoral routes. Determining optimal restoral routes involves calculating the cost of each possible restoral route. The cost of restoral routes is discussed, for example, in U.S. Pat. No. 5,459,716, entitled "Facility Restoration for Telecommunications Networks," assigned to the assignee of the present application, and which is incorporated herein by reference. By maximizing the spans of a restoral route, the number of cost calculations is minimized, thereby minimizing the processing and time required. Therefore, the present invention's maximization of failure spans minimizes the number of cost calculations required for determining optimal restoral routes.

As noted above, prior art network restoration systems use logical network or trunk topology to isolate network failures and determine restoral routes. Such prior systems require numerous algorithms to be processed in order to correlate alarms received from the various trunks, based on the equipment and nodes traversed by each trunk, to locate the point of failure in the network. Performing these algorithms during the restoration process introduces unnecessary and costly delays. The present invention, conversely, employs physical topology data (i.e., node and inter-node links) to determine a maximum network span that can be treated or implemented with a single pre-plan, and thereby expedite the restoration process.

Logical topology of the network 10 changes frequently, such as the rerouting of a traffic trunk, but such rerouting generally does not impact the physical topology data. Nevertheless, the computer 32 preferably performs the routine 200 regularly. As a result, the chance of erroneously deriving failure spans for the network 10 based on the physical topology data is small, despite frequent rerouting of traffic trunks, etc.

Although specific embodiments of, and examples for, the present invention are described herein for illustrative purposes, various equivalent modifications can be made without departing from the spirit and scope of the invention, as will be recognized by those skilled in the relevant art. The teachings provided herein of the present invention can be applied to other communications or network systems, not necessarily the exemplary systems described above. For example, while the present invention as been generally described above as being employed in the telecommunications network 10, the present invention is equally applicable to other communication systems, such as a network of computers.

The present invention can receive physical topology data based on a trunk of any type and capacity from which the present invention generates failure spans or groups of inter-node connection data. Furthermore, while the terms trunk and link are defined above as routing telecommunications traffic, the present invention can analyze any communication channel or path between nodes and employ any topology data representing such channels or paths, as will be understood by those skilled in the relevant art. Moreover, the term node applies to any point receiving or transmitting signals, not necessarily a DXC system or other telecommunications equipment coupled between two trunks.

While certain operations under the present invention have been described as occurring generally in a serial fashion, those skilled in the relevant art will recognize that it is entirely within the scope of the invention to conduct some operations more or less simultaneously, or even in alternative order, from that described herein. Additionally, only portions of the present invention can be employed to identify only certain inter-node configurations in a network. Furthermore, the present invention can be modified to include or employ the systems and concepts of the inventor's copending applications noted above.

These and other changes can be made to the invention in light of the above detailed description. In general, in the following claims, the terms used should not be construed to limit the invention to the specific embodiments disclosed in the specification and the claims, but should be construed to include any network analysis system that operates under the claims. Accordingly, the invention is not limited by the disclosure, but instead its scope is to be determined entirely by the following claims.

I claim:

1. In a telecommunication network having a plurality of nodes interconnected by links, a computer-implemented method for analyzing the network comprising the steps of:

receiving physical network data for each of the plurality of nodes and links intercoupling the nodes;

identifying stranded network non-rings in the network based on the physical network data;

determining a maximum restoration span for failures in any identified stranded network non-rings in the network;

identifying non-ring network spurs in the network based on the physical network data;

determining a maximum restoration span for failures in any identified non-ring network spurs in the network;

identifying stranded network rings in the network based on the physical network data;

determining a maximum restoration span for failures in any identified stranded network rings in the network;

identifying network spur nodes with diversity in the network based on the physical network data, the spur nodes with diversity having a plurality of geographically diverse paths from the spur node to a remainder of the network;

determining a maximum restoration span for failures in any identified network spur nodes with diversity in the network;

identifying network segments with pass-through nodes in the network based on the physical network data;

determining a maximum restoration span for failures in any identified network segments with pass-through nodes in the network;

identifying network segments without pass-through nodes in the network based on the physical network data;

determining a maximum restoration span for failures in any identified network segments without pass-through nodes in the network; and outputting data reflecting the maximum restoration spans.

2. The method of claim 1 wherein the step of identifying stranded network non-rings includes the steps of:

selecting a node having only one link from the physical network data;

locating at least one node having two links from the physical network data, the at least one located node being linked with the selected node; and identifying a node having not greater than two links from the physical network data, the identified node being linked to the at least one located node, and wherein the step of determining a maximum restoration span for failures in any identified stranded network non-rings includes identifying the maximum restoration span as extending from the selected node to the identified node.

3. The method of claim 1 wherein the step of identifying non-ring network spurs includes the steps of:

selecting a node having only one link from the physical network data;

locating any nodes having not greater than two links from the physical network data, each located node being linked with the selected node or with one of the located nodes; and identifying a node having greater than two links from the physical network data, the identified node being linked to one of the located nodes, and wherein the step of determining a maximum restoration span for failures in any identified non-ring network spurs includes identifying the maximum restoration span as extending from the selected node to the identified node.

4. The method of claim 1 wherein the step of identifying stranded network rings includes the steps of:

selecting a node having only two links from the physical network data;

locating at least one node having not greater than two links from the physical network data, each located node being linked with the selected node or with one of the located nodes; and identifying a node from the located nodes that is identical to the selected node, and wherein the step of determining a maximum restoration span for failures in any identified stranded network rings includes identifying the maximum restoration span as extending from the selected node to the identified node.

5. The method of claim 1 wherein the step of identifying network spur nodes includes the steps of:

selecting a node having two or more links from the physical network data; and determining if the two or more links from the selected node are all coupled to a second node, and wherein the step of determining a maximum restoration span for failures in any identified network spur nodes includes identifying the maximum restoration span as extending from the selected node to the second node.

6. The method of claim 1 wherein the step of identifying network segments with pass-through nodes includes the steps of:

selecting a node having two links from the physical network data;

locating all nodes having not greater than two links in a first direction from the physical network data, each located node in the first direction being linked with the selected node or with one of the located nodes and not having any terminating trunks thereat;

identifying a node having greater than two links from the physical network data, the identified node being linked to at least one located node;

locating any node having not greater than two links in a second direction from the physical network data, the any located node in the second direction being linked with the selected node and not having any terminating trunks thereat; and determining a node having greater than two links from the physical network data, the identified node being linked to at least one located node in the second direction;

and wherein the step of determining a maximum restoration span for failures in any identified network segments with pass-through nodes includes identifying the maximum restoration span as extending from the identified node to the determined node.

7. The method of claim 1 wherein the step of identifying network segments without pass-through nodes includes the steps of:

selecting a node having greater than two links from the physical network data; and locating a node having greater than two links from the physical network data, the located node being linked with the selected node, and wherein the step of determining a maximum restoration span for failures in any network segments without pass-through nodes includes identifying the maximum restoration span as extending from the selected node to the located node.

8. The method of claim 1 wherein the step of receiving physical network data includes receiving network data for only DS-3 telecommunication links in the network.

9. The method of claim 1, further comprising the step of developing a plurality of network restoration plans based on at least some of the determined maximum restoration spans, wherein each restoration plan includes rerouting instructions for the network to compensate for a disruption of one of the links in the network.

10. In a network having a plurality of communication paths coupling a plurality of nodes, a computer-implemented method for analyzing the network comprising the steps of:

receiving network data for each of the plurality of nodes and paths intercoupling the nodes;

identifying a plurality of inter-node configurations based on the received network data;

determining a plurality of network spans from the identified inter-node configurations in the network; and outputting data of the plurality of network spans, and wherein the network data includes physical network topology data, and wherein the step of identifying a plurality of inter-node configurations includes locating stranded network non-rings, non-ring network spurs, stranded network rings, network spur nodes with diversity, network segments with pass-through nodes and network segments without pass-through nodes in the network from the network data.

11. The method of claim 10 wherein the plurality of communication paths in the network include communication paths having greater and lesser bandwidth, and wherein the step of receiving network data includes receiving network data for only the paths having the greater bandwidth.

12. The method of claim 10 wherein the step of identifying a plurality of inter-node configurations includes the steps of:

selecting a first node having a selected number of paths from the network data;

locating a second node having a predetermined number of paths from the network data, the second node being coupled with the selected node; and identifying a third node having a preselected number of paths from the network data, the third node being coupled to the second node, and wherein the step of determining a plurality of network spans includes identifying a maximum span as extending from the third node to the first node.

13. The method of claim 10 wherein the step of identifying a plurality of inter-node configurations includes the steps of:

selecting a node having only one path from the network data;

locating at least one node having two paths from the network data, the at least one located node being coupled with the selected node; and identifying a node having not greater than two paths from the network data, the identified node being coupled to the at least one located node, and wherein the step of determining a plurality of network spans includes determining a maximum span as extending from the selected node to the identified node.

14. The method of claim 10 wherein the step of identifying a plurality of inter-node configurations includes the steps of:

selecting a node having only one path from the network data;

locating any nodes having not greater than two paths from the network data, each located node being coupled with the selected node or with one of the located nodes; and identifying a node having greater than two paths from the network data, the identified node being coupled to one of the located nodes, and wherein the step of determining a plurality of network spans includes determining a maximum span as extending from the selected node to the identified node.

15. The method of claim 10 wherein the step of identifying a plurality of inter-node configurations includes the steps of:

selecting a node having only one path from the network data;

locating at least one node having not greater than two paths from the network data, each located node being coupled with the selected node or with one of the located nodes; and identifying a node from the located nodes that is identical to the selected node, and wherein the step of determining a plurality of network spans includes determining a maximum span as extending from the selected node to the identified node.

16. The method of claim 10 wherein the step of identifying a plurality of inter-node configurations includes the steps of:

selecting a node having two or more paths from the network data; and determining if the two or more paths from the selected node are all coupled to a second node, and wherein the step of determining a plurality of network spans includes determining a maximum span as extending from the selected node to the second node.

17. The method of claim 10 wherein the step of identifying a plurality of inter-node configurations includes the steps of:

selecting, from the network data, an end node adjacent to a node having only two paths;

locating all nodes, including the adjacent node, having not greater than two paths from the network data, at least one located node being coupled with the selected node and not having any terminating trunks thereat; and identifying a node having greater than two paths from the network data, the identified node being coupled to at least one located node;

and wherein the step of determining a plurality of network spans includes determining a maximum span as extending from the end node to the identified node.

18. The method of claim 10 wherein the step of identifying a plurality of inter-node configurations includes the steps of:

selecting a node having greater than two paths from the network data; and locating a node having greater than two paths from the network data, the located node being coupled with the selected node, and wherein the step of determining a plurality of network spans includes determining a maximum span as extending from the selected node to the located node.

19. The method of claim 10, further comprising the step of developing a plurality of network restoration plans based on the determined plurality of network spans.

20. The method of claim 10, further comprising the steps of:

receiving a plurality of alarms from at least one of the plurality of nodes in the network; and identifying a location of a failure in the network based on the determined plurality of network spans.

21. In a network having a plurality of communication paths coupling a plurality of nodes, an apparatus comprising:

a storage device having stored therein network data regarding each of the plurality of nodes and paths inter-coupling the nodes; and a computer system coupled to the storage device, the computer system receiving the network data, identifying a plurality of categories of inter-node configurations based on the received network data, and determining a plurality of network spans from the identified inter-node configurations in the network, and wherein the network data includes physical network topology data, and wherein the computer system identifies a plurality of different inter-node configurations, including stranded network non-rings, non-ring network spurs, stranded network rings, network spur nodes with diversity, network segments with pass-through nodes and network segments without pass-through nodes in the network from the network data.

22. The apparatus of claim 2 wherein the computer system: (a) selects a first node having a selected number of paths from the network data; (b) locates a second node having a predetermined number of paths from the network data, the second node being coupled with the selected node; (c) identifies a third node having a preselected number of paths from the network data, the third node being coupled to the second node; and (d) determines a maximum span as extending from the third node to the first node.

23. The apparatus of claim 2 wherein the computer system: (a) selects a node having two or more paths from the network data; (b) determines if the two or more paths from the selected node are all coupled to a second node; and (c) determines a maximum span as extending from the selected node to the second node.

24. The apparatus of claim 21 wherein the computer system (a) selects from the network data an end node adjacent to a node having only two paths; (b) locates all nodes, including the adjacent node, having not greater than two paths from the network data, at least one located node being coupled with the selected node and not having any terminating trunks thereat; (c) identifies a node having greater than two paths from the network data, the identified node being coupled to at least one located node; and (d) determines a maximum span as extending from the end node to the identified node.

25. In a network having a plurality of communication paths coupling a plurality of nodes, an apparatus for analyzing the network comprising:

means for receiving network data for each of the plurality of nodes and paths inter-coupling the nodes;

means, coupled to the means for receiving, for identifying a plurality of inter-node configurations based on the received network data; and means, coupled to the means for identifying, for determining a plurality of network spans from the identified inter-node configurations in the network, and wherein the means for identifying a plurality of inter-node configurations includes means for locating stranded network non-rings, non-ring network spurs, stranded network rings, network spur nodes with diversity, network segments with pass-through nodes and network segments without pass-through nodes in the network from the network data.

26. The apparatus of claim 25 wherein the means for identifying a plurality of inter-node configurations includes:

means for selecting a first node having a selected number of paths from the network data;

means, coupled to the means for selecting, for locating a second node having a predetermined number of paths from the network data, the second node being coupled to the selected node; and means, coupled to the means for locating, for finding a third node having a preselected number of paths from the network data, the third node being coupled to the second node, and wherein the means for determining a plurality of network spans identifies a maximum span as extending from the third node to the first node.

27. The apparatus of claim 25 wherein the means for identifying a plurality of inter-node configurations includes:

means for selecting, from the network data, an end node adjacent to a node having only two paths;

means, coupled to the means for selecting, for locating all nodes, including the adjacent node, having not greater than two paths from the network data, at least one located node being coupled with the selected node and not having any terminating trunks thereat; and means, coupled to the means for locating, for finding a node having greater than two paths from the network data, the identified node being coupled to at least one located node;

and wherein the means for determining a plurality of network spans determines a maximum span as extending from the end node to the identified node.

* * * * *